UNITED STATES PATENT OFFICE.

ALFRED R. HUSSEY, OF CHICAGO, ILLINOIS.

SOLDERING COMPOUND.

No. 812,494.  Specification of Letters Patent.  Patented Feb. 13, 1906.

Application filed October 12, 1903. Renewed June 5, 1905. Serial No. 263,870.

*To all whom it may concern:*

Be it known that I, ALFRED R. HUSSEY, a citizen of the United States, residing at Chicago, in the county of Cook and State of Illinois, have invented new and useful Improvements in Soldering Compounds, of which the following is a specification.

This invention relates to soldering compounds; and its purpose is to provide an improved compound which may be fused for soldering by slight heat and which will not be prevented from adhering so as to effect its purpose by the oxidation caused by the flame used to fuse it or by the deposit of soot or other result of such flame on the surfaces to be joined and which, notwithstanding it may be so readily fused for soldering, will resist a greater amount of heat after it has become fused and fluxed in the soldering process.

It consists of the composition set out in the claims.

My improved compound consists of suitable soldering metals finely comminuted and mixed with beeswax, paraffin, tallow, or other substantially non-volatile vegetable, animal, or mineral wax or fat impregnated with a proper flux. The wax or fat should coat every particle of the comminuted metal. When two or more metals are employed, they should be very thoroughly mixed, and preferably in the case of such metals as lead and tin, for example, they should be melted for such intermixture and the mixed metal when cooled should be ground or crushed to reduce it to the proper comminuted condition. It may be coarsely granular or finely granular or pulverulent, according to the class of work to which it is to be applied; but it should not be ground to a flour or impalpable powder, for I find that when this is done the mass coheres so closely as to be almost equivalent to a solid metal body, and it is correspondingly difficult to fuse. The flux should be mixed with the wax or fat so as to thoroughly impregnate the latter, and with the metals properly comminuted a sufficient quantity of the flux-impregnated wax or fat should be mixed to coat every part of the metal with a film of the wax or fat. For thus mixing the elements they should be heated to a temperature sufficient to melt the wax or fat.

For soft solder I grind together lead and tin in proportions varying by known rules, according to the degree of hardness required, from lead and tin in equal parts to lead and tin in proportions of three to one, according to the use to be made of the solder and the conditions under which it is to be applied. A convenient mixture suitable for a wide range of soldering purposes consists of one part lead, one part tin, one-eighth part beeswax, and one-eighth part chlorid of zinc, (by measure.) I do not limit myself to this particular flux, and those familiar with the art will be able to select the flux according to the conditions under which the compound is to be used. To the above mixture there may be added one-eighth part of rosin for hardening the compound and for its value as a flux. The rosin may be either ground in with the metals or melted and mixed with the wax or fat; but when such a flux as chlorid of zinc is employed it is important that it should be first mixed with the wax or fat to impregnate the latter and that it should not be mixed directly with the metals, which tends to cause deliquescence and defeat the value of the compound for its purpose. Thorough intermixture of the metals with the flux-impregnated wax or fat is important, because the complete inclosure of each particle of the metal in a film of the flux-impregnated wax or fat is the condition of the attainment of the perfect result sought in the use of the compound. The purpose or value of the wax or fat is with respect to the flux to form a waterproofing and retain it permanently in condition for performing its office, and with respect to the metals to protect them from oxidation prior to use and to afford an insulation for heat in the use of the compound, and in the process of melting in use to protect from oxidation the surfaces to be joined, and also to afford a liquid vehicle for spreading the flux over the surfaces of both the soldering metals and the surfaces to be joined, and so cause it to be applied thinly and evenly.

The choice of the wax or fat and the proportion employed may be varied so as to produce a mixture varying in consistency from a paste to a comparatively hard substance or one which can be pressed or molded into firm condition. When the selection or proportion of wax or fat is such as to yield a comparatively hard substance, it may be molded or pressed into any desired form when the fat has cooled. For many purposes it is most convenient to mold it and press it into slender sticks or rods about one-fourth inch in diameter. When this form is chosen, for the purpose of rendering the stick or rod somewhat less liable to be broken up into inconvenient fragments it may be provided with a skin or wrapper of tin-foil, and when this is done a corresponding proportion of tin may be omitted from the mixture. The mechanical form, however, is a matter of convenience only, and it may be made into blocks or lumps of any size and shape. When made soft enough to constitute a paste, it should be protected by inclosure in a wrapper or case, preferably of sheet-tin. Even in the harder forms it may be crumbled, and for most purposes it is preferably sufficiently soft so that when crumbled it may be readily manipulated with the fingers, causing it as the wax or fat becomes warmed to become cohesive and plastic enough to be pressed into the crevices where it is to be fused or to be molded about the abutting edges or ends of the parts which are to be joined by it. For example, in using it to solder together copper wires in running electric circuits the wires being twisted together sufficiently to hold them in connection a little of the soldering compound may be pressed by the fingers upon the intertwined wires at their junction, and the quantity retained in such crevices will be sufficient to thoroughly secure the wires when fused.

The flame of a lighted match is sufficient to cause this solder compound in even its hard forms to become fused and flow in the joints which it is to secure. In this process the wax or fat is either burned away or melted and spreads the metals of the compound and the flux along all the surfaces of the joint, and when the metal of the compound fuses in the presence of the flux its tendency to cohere with the metal surfaces being much stronger than that of the wax or fat it drives the latter out of the crevices and completes the junction in so doing, so that any superfluous wax or fat is excluded from the joint proper which the solder secures. When the metal upon cooling sets in the joint, it cannot ordinarily be again fused without the application of a greater amount of heat than was required to fuse the mixture for the purpose of making the joint, and such joint is therefore as firm and hard as can be obtained by the use of ordinary solders in the ordinary manner. This solder can be applied and fused by a soldering-iron or any other customary means, as well as by a flame. I have referred to the flame of a lighted match merely as indicating the slight amount of heat necessary and not as indicating the form in which it must be applied.

One important function of the wax or tallow in this compound is to insulate the metal particles for heat, so that they individually become fused by a small amount of heat directed against the mass, because the heat is not conducted away; but each particle being very fine melts upon the application of the amount of heat which would melt it if encountered alone in suspension, whereas if it were either part of or resting upon a large mass of solid metal the heat would be conducted away so rapidly that it would be necessary to apply enough heat to raise the temperature of the mass for a considerable distance nearly to the fusing-point before the particle against which the heat is first directed would reach the proper temperature for fusing. The fineness to which the metals are ground, therefore, and the thoroughness of the mixture of the wax or fatty matter therewith affects the quality of the compound, making it operate in soldering with the less heat the finer it is ground and the more completely each fine particle is coated.

The proportions, as will be readily understood from the function of the wax or fat, may be varied within very wide limits without defeating the result or very materially affecting it. The waxy or fatty matter being sufficiently impregnated with the flux an excess above what is necessary of the flux no more interferes with the result than when an excess of flux is used in soldering by ordinary methods, and if there is a sufficient quantity of the flux-impregnated wax or fat to fairly coat each particle of metal with a film any excess of the coating material beyond what is necessary is melted or burned away in the process of fusing the solder. This will indicate also that it may sometimes be desirable to mix the metals with a much larger proportion of wax or fat than the minimum quantity necessary in order to make the wax or fat a vehicle for more widely distributing a small quantity of the metal for the purpose of applying the solder very thinly over the area where it is required. This expedient might be used, for example, if it were desired to solder a fine wire-gauze onto a metal surface without filling the meshes of the gauze with the solder, but only leaving enough to join the meshed wires to the metal surface. A relatively large quantity of wax or fat being used in the soldering compound such compound might be widely distributed in a film which when the wax or fat is melted out of it would leave only sufficient metal residuum to join the wires of the gauze to the plate without filling the meshes, and this residuum would flow by capillary attraction to the lines of contact of the wires with the plate, leaving the meshes open. This wide range of variation in the proportion of the wax or fat to the metals is therefore one desirable feature of this compound, and I do not limit myself, therefore, strictly to any exact proportions.

The above-mentioned non-volatile vegetable, animal, or mineral wax or fats—such as beeswax, paraffin, or tallow—are each and all substantially suitable for the purpose of my invention, and I design to include them all under the term "fatty substance," as employed in my claims, to define this element of the compound.

I claim—

1. An article of manufacture for soldering consisting of soft metals rendered finely granular and mixed with a flux-impregnated fatty substance, and made into sticks or bars.

2. An article of manufacture for soldering consisting of soft metals rendered finely granular, the same being mixed with a flux-impregnated fatty substance and made into sticks or bars, such sticks or bars being provided with a metal skin fusible at moderate temperature.

3. An article of manufacture for soldering consisting of soft metals rendered finely granular, the same being mixed with a flux-impregnated fatty substance and made into sticks or bars, such sticks or bars being inclosed in a retaining-skin of soft-metal foil.

4. An article of manufacture for soldering consisting of soft metals finely comminuted and mixed with a flux-impregnated fatty substance made into sticks or bars and provided with a tin-foil skin.

5. A soldering compound consisting of finely-granular lead and tin in the proportion of one part tin to from one to three parts lead, thoroughly mixed with a wax impregnated with chlorid of zinc.

6. A soldering compound consisting of soft soldering metals finely comminuted and thoroughly mixed with a flux-impregnated fatty substance hardened with rosin.

7. A soldering compound consisting of soft soldering metals finely comminuted and thoroughly mixed with flux-impregnated beeswax.

8. An article of manufacture for soldering consisting of soft metals intermixed with the proper flux and made into sticks or bars, in combination with a retaining-skin adapted to be fused with the substance of such sticks.

9. An article of manufacture for soldering consisting of soft metals rendered finely granular, the same being mixed with a flux-impregnated fatty substance and made into sticks or bars, in combination with a retaining-skin adapted to be fused with the substance of the sticks.

In testimony whereof I have hereunto set my hand, in the presence of two witnesses, at Chicago, Illinois, this 10th day of October, A. D. 1903.

ALFRED R. HUSSEY.

In presence of—
M. GERTRUDE ADY,
FREDK. G. FISCHER.